(No Model.)

W. McCLOSKEY.
HARVESTER.

No. 517,654. Patented Apr. 3, 1894.

3 Sheets—Sheet 1.

WITNESSES
J. W. Bradford
F. Clough

INVENTOR
William McCloskey
by Parker & Burton
Attorneys.

(No Model.) 3 Sheets—Sheet 2.

W. McCLOSKEY.
HARVESTER.

No. 517,654. Patented Apr. 3, 1894.

WITNESSES
F. Clough.
D. W. Bradford.

INVENTOR
William McCloskey
by Parker W Burton
Attorneys.

(No Model.) 3 Sheets—Sheet 3.
W. McCLOSKEY.
HARVESTER.
No. 517,654. Patented Apr. 3, 1894.
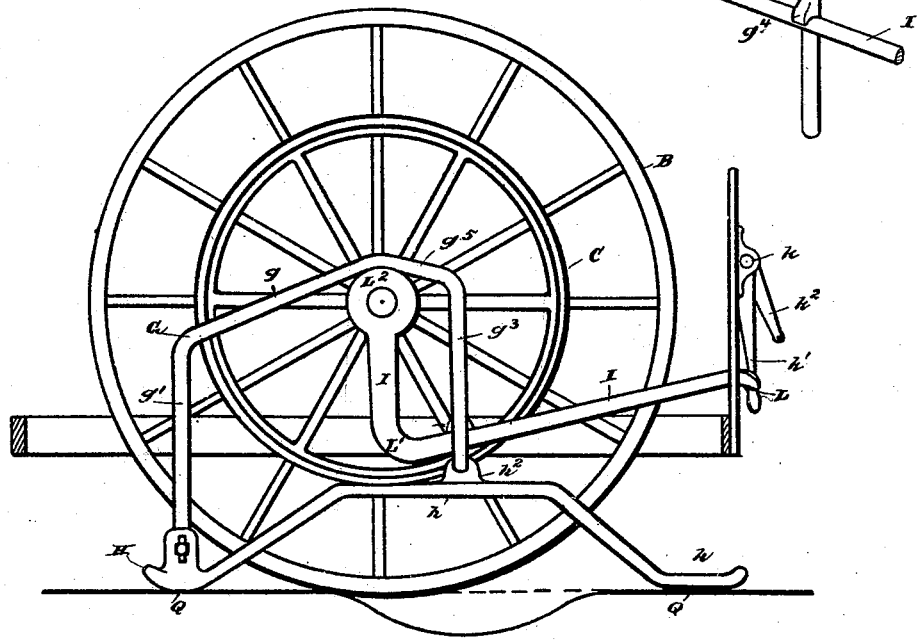
WITNESSES
H. Clough
D. W. Bradford
INVENTOR
William McCloskey
By Parker & Burton
Attorneys.

UNITED STATES PATENT OFFICE.

WILLIAM McCLOSKEY, OF ESSEX, CANADA, ASSIGNOR OF ONE-HALF TO ALEM J. GREEN, OF SAME PLACE.

HARVESTER.

SPECIFICATION forming part of Letters Patent No. 517,654, dated April 3, 1894.

Application filed January 31, 1893. Serial No. 460,380. (No model.)

*To all whom it may concern:*

Be it known that I, WILLIAM McCLOSKEY, a subject of the Queen of Great Britain, residing at Essex, county of Essex, Province of Ontario, Canada, have invented a certain new and useful Improvement in Harvesters; and I declare the following to be a full, clear, and exact description of the invention, such as will enable others skilled in the art to which it pertains to make and use the same, reference being had to the accompanying drawings, which form a part of this specification.

My invention relates more particularly to harvesters, although it is applicable to mowers and tools of analogous construction; and it consists broadly in means combined and arranged therewith for the purpose of transferring the machine over what are commonly known among farmers as dead furrows, or small ditches which are numerous in grain fields, without allowing the carrying wheels of the same to drop into the furrow and thus create jolting and uneven cutting; while it at the same time provides for the continued driving of the machinery.

Figure 1:
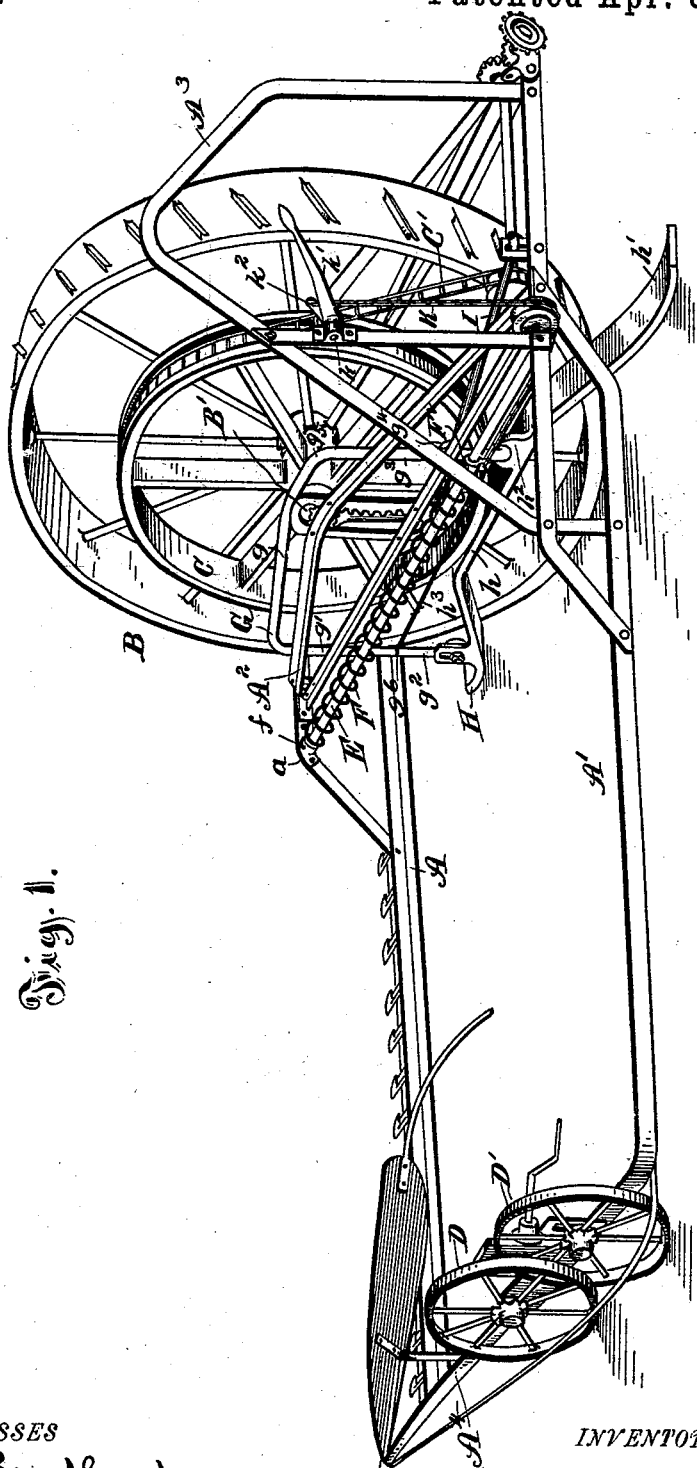
Figure 2:
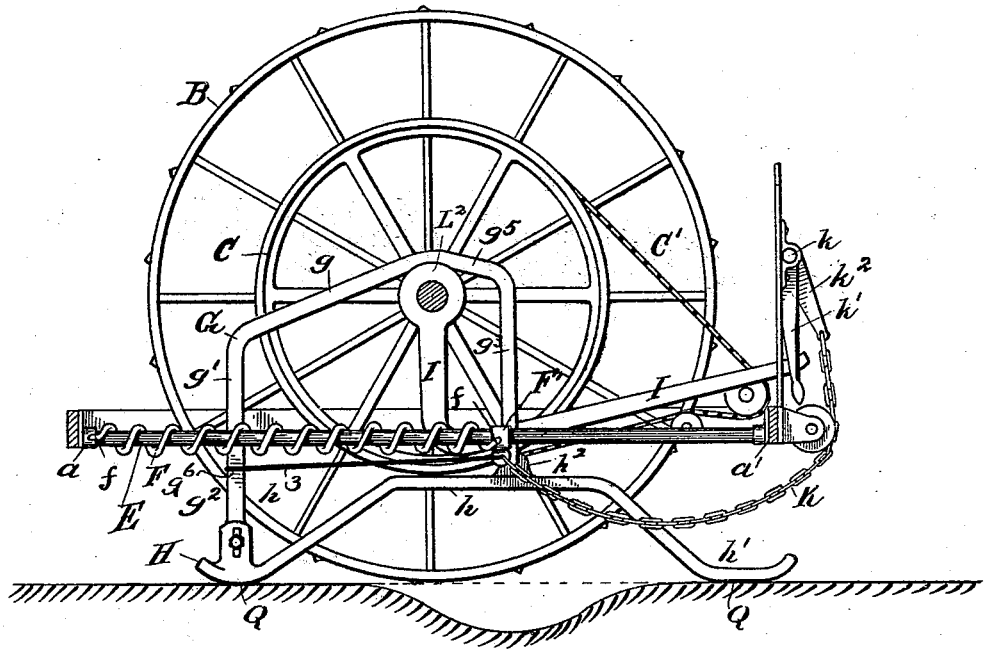
Figure 3:
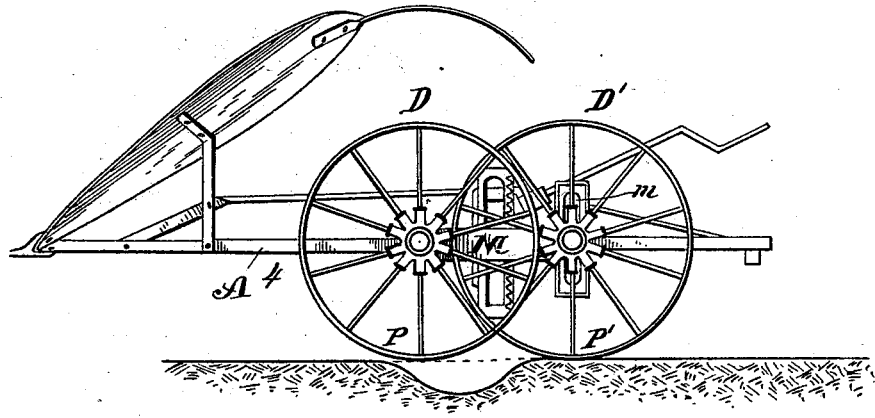

In the drawings, Figure 1 is a perspective of a portion of a reaper with my improvements attached, the binding apparatus and the platform being omitted for the purpose of showing the relation of the various parts to each other to better advantage. Fig. 2 is an elevation, looking from the platform side, of the driving wheel and mechanism of my improvement, with the various parts enlarged, and showing more particularly their arrangement and combination, and also the manner of transferring the driving wheel over the depression mentioned. Fig. 3 is an elevation of the outer end of the machine, the ground being in section, as in Fig. 2, for the purpose of showing the mechanism whereby the outer end is transferred over a depression. Fig. 4, is an elevation of the driving wheel, with the platform removed, showing the principal features of the bridge mechanism. Fig. 5, is a detail figure showing the engagement, by frictional contact of certain portions of the mechanism hereinafter described.

Similar letters refer to similar parts.

In the drawings, A, A', $A^2$, $A^3$, $A^4$, represent the several parts of the harvester frame, concerning which there is nothing new in the construction.

B represents the driving wheel, which is journaled in the usual manner, and is shown in the machine illustrated as being adjustable as to height by means of a rack and pinion mounted between its journal and the frame at B'. Concerning this there is nothing new, and hence it is not necessary to further describe it.

C is a smaller wheel rigidly attached to the main axle and revolving with the main wheel B, and serving as a band wheel by which the driving mechanism is operated by means of the chain C', concerning this there is nothing new. At the outer end of the frame are shown two carrying wheels D, D', which are more fully illustrated in Fig. 3. These operate in conjunction, as will be hereinafter explained, with the mechanism, for the purpose of carrying the driving wheel over a dead furrow or a depression. The apparatus particularly designed for that purpose, in connection with the driving wheel, is more clearly shown in Fig. 2. Inside of the main frame is arranged a girt or bar E, both ends of which are firmly and immovably attached at a, a', to the front and rear cross bars of the frame. Surrounding the bar E is a coiled spring F of considerable elastic strength, one end of which, f, is firmly attached to the frame, and the other end of which, at f', is attached to a sliding block, F', which moves longitudinally upon the bar E as a guide. Pivotally attached to a lug, $h^2$, on the shoe H, is a yoke G, which extends upward, $g^3$, forward, $g^5$, and then downward at a slight angle, as shown at g, and thence perpendicularly downward at g' near the ground level of the machine. As shown in Figs. 1 and 2, this yoke passes over the axle or hub of the driving wheel for the purpose that will be hereinafter described. To the lower extremity of the front end of the yoke G at $g^2$ is attached a shoe H, the front end of the shoe inclining slightly upward, as particularly shown in Fig. 2; thence descends in a curvature to a point, as shown in Fig. 2, about level with the bottom of the driving wheel, thence rising rearward and upward a distance substantially equal, perpendicularly, to the difference between the radii of the wheel C and the wheel D; thence rearward and horizontally at $h$ for a distance equal to about two-thirds of the radius of the driving-wheel; thence angularly rearward and downward to substantially a level with the bottom of the driving wheel or normal surface of the land; thence horizontally rearward at $h'$ to form another shoe, and terminating with a slight incline upward at the rear. The rear portion of the yoke G is also carried downward substantially perpendicularly at $g^3$, being pivotally connected, as hereinbefore stated, with the lug $h^2$ on the shoe H. The sliding block, F', to which the spring F is attached, is connected by a tie rod $h^3$ to the front portion $g^2$ of the yoke G, at $g^6$. It is obvious that the yoke G and the shoe H form a movable frame which is capable of transverse motion from front to rear, which motion is resisted by the tension of the spring acting through the rod $h^3$. As shown in Fig. 2, the shoe is drawn to the rear from its normal position a distance equal to about the length of the upper horizontal portion $g'$. The lug $h^2$ being formed on the edge of the shoe H, has a transverse offset far enough to permit the width of the tire of the wheel D to rotate along the upper horizontal portion $h$ of the shoe H, from rear to front in the manner which is hereinafter described. Connected with the frame is another cross bar, I, which descends from an attachment at $L^2$ with the axle of the driving wheel to a point $L'$, substantially on a horizontal plane with the rod E; bending at an angle to the rear, it extends on an angle substantially the same as that of the portion of the yoke marked $g$ to the point of rigid attachment on the frame at L, as shown in Fig. 4. The rear perpendicular portion of the yoke, $g^3$, descends in close proximity to the angular portion of the cross bar I; rigidly fastened upon $g^3$ is a lug, $g^4$, the under surface of which is adapted to engage and slide upon the angular portion of the frame I as the yoke and shoe is drawn to the rear as shown in Fig. 5. By this means of construction, in conjunction with the angular portion $g'$ of the forward portion of the yoke riding over the hub or axle of the driving wheel, it is evident that as the yoke and its attached shoe is drawn to the rear in opposition to the tension of the spring after it reaches the point of angularity of the upper portion of the yoke, as shown in Fig. 2, both the upper and the rear portions are raised, thus wholly raising thereby the shoe H.

Means is provided for positively drawing the frame-work composed of the shoe and yoke to the rear against the tension of the spring, which means consists of the chain K, attached at one end to the sliding block F', passing under a friction wheel at the rear of the machine, and to an arm, $K^2$, attached to a rock shaft $k$, and which is adapted to be raised by a lever rigidly attached to the same rock shaft and designated by $k'$. The rotation of the lever rearward and upward would necessarily draw the chain, and with it its attachments, against the tension of the spring, and by means of the inclined portion of the yoke and the inclined portion of the frame I, the whole apparatus, including the shoe H, is thereby, when so drawn to the rear, lifted from the ground.

In order to provide for the carrying of the opposite end of the machine over a furrow, I have provided the apparatus more particularly shown in Fig. 3. Harvesters are now usually constructed with an outer wheel which carries the weight of the outer end of the platform and cutter bar, and which is made adjustable to regulate the height of the platform by various means, usually by means of a slot in the frame, a sliding block in the slot, and a bearing for the wheel being attached to the block, means being provided whereby the block can be firmly but adjustably held out in position in the perpendicular slot in the frame. As these devices are old, and are very common, it is not necessary to describe them further. In the place, however, of the single wheel, I attach a horizontal cross bar M to the adjustable block, extending from front to rear in the direction of the line of travel. At either end of this cross bar, by means of suitable bearings, are attached wheels, D, D', the radius of each wheel being somewhat less than the length of the cross bar M. The bearings of these wheels involve nothing new, except that one is transversely longer than the other, permitting the wheels to be in the position shown. However, one of them is made adjustable perpendicularly, by means of enlarging the cross bar M and forming a perpendicular slot $m$ in the enlarged end, the bearing of the wheel being adjusted and held by the usual means at any position in the slot. It is obvious that the wheels ordinarily would both run upon level ground, and that one of them being made adjustable, as specified, would permit the body of the machine with the platform, to be tilted downward toward the grain, or to be raised, and to run in either position if desired.

The cross bar M is of sufficient length, and the wheels D, D', are a sufficient distance apart, so that in passing over ordinary dead furrows one wheel will be upon one bank of the dead furrow, and as it leaves it the other wheel will strike and ride upon the opposite bank, without permitting the platform to descend, as would be the case with the travel of a single wheel. This is shown at P, P', in Fig. 3.

Having thus described my apparatus, its mode of operation is as follows: Assuming that the harvester is approaching a dead furrow, with the shoe H slightly raised from the ground, the spring having drawn it forward to its normal position whereby the rear upper angle of the yoke is closely brought to the hub of the driving wheel. When the driving wheel slightly descends into the concavity of the earth, the shoe H, being of sufficient length, has its two bearing surfaces brought to the ground upon either side of the depression, as is represented at Q and Q'. Instantly, the band wheel, upon this slight descent of the driving wheel, is brought in contact with the upper horizontal portion of the shoe as a tread; the shoe thereupon remains stationary upon the ground, stretching the spring F; the driving wheel continues to revolve by means of the friction of the face of the band wheel upon the tread h of the shoe, until as the forward extremity of that tread is reached the band wheel runs off from the tread, and the driving wheel strikes the opposite bank of the furrow, the apparatus is raised slightly from the ground by the continued rotation of the driving wheel, and the chain K being loose, the spring instantly draws the yoke and shoe forward to their original position, in readiness for the next furrow. In case the driving wheel is run in a furrow longitudinally, the shoe may be raised from the ground by withdrawing it and its yoke to the rear, upon the incline I, by means of the chain K and the lever k. It will be held in that position until released, when the spring will instantly draw it to its normal position ready for operation when passing transverse furrows. Simultaneously with the action of the device thus operating in relation to the driving wheel in crossing furrows, the wheels D, D', at the outer end of the platform also transfer the platform across the furrow without jolting, in the manner hereinbefore described.

Having thus described my invention, what I claim is—

1. In combination with the driving wheel of a harvester and the frame thereof, a shoe adapted to rest upon both sides of a furrow, and having an intermediate portion raised above the ends, and adapted to sustain the machine by rolling contact with an auxiliary wheel attached to the driving wheel, substantially as described.

2. In a harvester, the combination of the frame, double drive wheels journaled therein and firmly attached to each other, one of said wheels being of less diameter than the other, a shoe with two depressed ends and rising centrally and adapted to receive the tread of the smaller wheel, means for raising said shoe from the ground as the wheel progresses, and means for returning said shoe to its original position preparatory to receiving the tread of the smaller wheel in its further operation, substantially as described.

3. In a harvester, in combination with the main driving wheel consisting of two concentric sections, one of less diameter than the other, of an automatically adjustable bridge upon which the smaller section of the driving wheel may travel, means for withdrawing the bridge to the rear operated by the driver, and means for locking the same when in the rearward position, substantially as described.

4. In a harvester, the combination of a frame, a driving wheel consisting of two parts, one larger than the other, journaled at one end of said frame, a shoe adjustably connected therewith and adapted at each end to rest upon the ground, and adapted centrally to receive the tread of the smaller of two wheels as the larger one leaves the ground, and means for operating the same, and two wheels located at the opposite end of said frame, one forward of the other, in such manner that as one fails of support upon the ground, the other will receive the weight and support the same until the forward one is again brought to bear upon the ground, substantially as and for the purpose described.

In testimony whereof I sign this specification in the presence of two witnesses.

WILLIAM McCLOSKEY.

Witnesses:
R. A. PARKER,
MARION A. REEVE.